(12) United States Patent
Malik

(10) Patent No.: US 11,797,349 B2
(45) Date of Patent: Oct. 24, 2023

(54) SYSTEM OF EVALUATING DATA PRODUCTION PROCESSORS FOR DATA PRODUCTION, PROCESSING, AND TRANSFER TASKS USING NEURAL NETWORKS

(71) Applicant: Gibran Ali Malik, Jamaica, NY (US)

(72) Inventor: Gibran Ali Malik, Jamaica, NY (US)

(*) Notice: Subject to any disclaimer, the term of this patent is extended or adjusted under 35 U.S.C. 154(b) by 75 days.

(21) Appl. No.: 17/406,055

(22) Filed: Aug. 18, 2021

(65) Prior Publication Data

US 2021/0382758 A1    Dec. 9, 2021

Related U.S. Application Data

(63) Continuation-in-part of application No. 16/153,548, filed on Oct. 5, 2018, now abandoned.

(51) Int. Cl.
*G06F 9/50* (2006.01)

(52) U.S. Cl.
CPC .................. *G06F 9/5044* (2013.01)

(58) Field of Classification Search
None
See application file for complete search history.

(56) References Cited

U.S. PATENT DOCUMENTS

| | | | |
|---|---|---|---|
| 8,700,614 B1* | 4/2014 | Diller | G06F 16/24578 707/723 |
| 8,935,263 B1* | 1/2015 | Rodriguez | G06Q 30/02 707/748 |
| 9,256,855 B2* | 2/2016 | MacLaughlin | G06Q 10/10 |
| 9,595,041 B2* | 3/2017 | Wanker | G06Q 30/02 |
| 9,990,609 B2* | 6/2018 | Davar | G06Q 30/0601 |
| 2006/0123014 A1* | 6/2006 | Ng | G06F 16/951 |
| 2008/0140566 A1* | 6/2008 | Chowins | G06Q 20/10 705/39 |
| 2017/0004548 A1* | 1/2017 | Goel | G06Q 30/0282 |

* cited by examiner

*Primary Examiner* — Paul S Schwarzenberg

(57) ABSTRACT

A system and method of evaluating processors by first operating a neural network to receive primary data created by data producing processors, including graphical or audio data, as an input layer, with the neural network configured to predict processor evaluations, then blending processor evaluations derived from the neural network with evaluations obtained from processors requesting the primary data, then taking a modified average of a continuing series of blended evaluations to obtain processor performance evaluations. The processor performance evaluations are then used to match data producing processors with data requesting processors.

8 Claims, 10 Drawing Sheets

SYSTEM OF EVALUATING DATA PRODUCTION PROCESSORS FOR DATA PRODUCTION, PROCESSING, AND TRANSFER TASKS USING NEURAL NETWORKS

PRIORITY CLAIM

This application claims the benefit of and priority to and is a continuation-in-part of U.S. non-provisional application Ser. No. 16/153,548 filed Oct. 5, 2018. The referenced application is incorporated herein as if restated in full.

BACKGROUND

Data production, processing, and transmission is fundamental to computer-based operations, including scientific and business operations. Accordingly, processors are evaluated based on their ability to produce, process, and transmit data. Vast efforts and resources are invested in the pursuit of increasing the speed and efficiency of both hardware and software. Value is generally reduced to the raw computing speed of individual processors, but processors do not exist in a vaccuum, and their value is often dependent on their configuration and role in the systems in which the processors operate. These systems typically comprise pluralities of processors engaging in various data production, processing, and transfer tasks, with the occurrence and frequency of a data transfer task depending on factors unrelated, or at least indirectly related to the mere speed and efficiency of the processors. Often overlooked, from a purely technological perspective, is the quality and utility of the data itself, which affects the occurrence and frequency of future data transfer events. The quality and utility of data are closely integrated in the sense that data which has a utility may be considered high in quality, but they are different in the sense that data may be of great utility but low in quality because of the degree to which it is currently needed as the best of its kind but can be improved via further processing. Further, data of the highest quality may paradoxically be of less utility because processors may be insufficiently equipped to handle that data, and therefore data of lower quality may be necessary or preferred. Thus, utility and quality may be judged based on multiple factors implicit in the use of data in applications, including the significance placed on the use of the data, the degree to which the data is modified or combined with other data parcels, the frequency with which the data is used, and the subsequent demand placed on the processors producing the data. Although data may ultimately be evaluated by an end user in terms of its quality, it is more feasible for computers to evaluate the utility. Since the utility of the data is often a consequence of the processors producing the data, because more powerful processors are able to make more rigorous calculations, the utility of the data is, when the average data parcel produced by a processor is considered, the utility of the processor. This is particularly true with respect to the data produced by neural networks, which require massive processing power to operate. In the development of superior processors designed to handle neural networks, it is necessary to run experiments on pluralities of processors operating neural networks in order to identify superior models. In particular, since the superior processor for operating neural networks is not necessarily merely the fastest, but the one most capable of handling and processing vast sums of data based on desired neural network structures, what is needed is a system and method of evaluating the utility of data and prioritizing the data production, processing, and transfer capabilities of effective processors over less effective processors. Additionally, a system and method is needed to avoid wasting the most effective processors by pairing them with processors that are unable to fully utilize the most effective processing power, thereby, enabling the pairing of processors that are closely matched in terms of their requirements and capacities for data production, processing, and transfer.

SUMMARY

The system may comprise one or more processors connected over a network. Each of the one or more processors is coupled to one or more data production and processing applications, with the one or more software applications coupled to one or more input devices, including audio capturing devices, such as a microphone, and image capturing devices, such as a camera. Each of the one or more processors is coupled to data transfer hardware, such as those that provide access to the network. Each of the processors may be configured to operate one or more neural networks, including recurrent neural networks and convolutional neural networks. Each of the one or more processors is connected over the network to a processor performance evaluation system which operates substantially on a control processor and which is designed to evaluate data production, processing, and transfer events.

The processor performance evaluation system is configured to receive a data transfer request from a first processor (referred to as a "requesting processor"), relay the request to a given second processor (referred to as a "producing processor") based on past evaluations of data transfer performance of the second processor, receive a data transfer from the second processor, perform a first evaluation of the data comprising the data transfer as well as the speed and method of the transfer, relay the data transfer to the requesting processor, receive a second evaluation of the data from the requesting processor, perform a third evaluation by combining the first and second evaluation, and adjust the data transfer performance evaluation of the second processor based on the third evaluation. The first evaluation may be performed by a neural network based on hidden (weighted) qualities the neural network determines pertinent based on its training, and may be referred to as the "neural evaluation". The second evaluation may be referred to as a "utility evaluation" or a "client evaluation". The third evaluation may be referred to as the "blended evaluation". Thus the data transfer performance evaluation assigned to the producing processor is a result of a series of blended evaluations. In one variation, the influence of early blended evaluations on the data transfer performance evaluation is dampened in order to reduce the significance of errors in early configurations of the producing processor.

The processor performance evaluation system is configured to distinguish between primary data transfers and secondary data transfers, where secondary data transfers contain data ancillary to a primary data transfer, where both the primary and secondary data transfer are transmitted to a requesting processor from a producing processor.

The primary data transfer corresponds to data requested by the requesting processor and may comprise content such as graphical, textual, and/or audio data and which may be a creation of style transfer neural networks or other content-creating neural networks. The data may alternatively comprise mathematical models produced by a neural network tasked with data parsing and modeling.

The secondary data transfers may provide data that assists the requesting processor in using the data received in the primary data transfer, such as by indicating the data format for processing of the data in the primary data transfer, or by indicating the sequence of the primary data transfer with respect to prior or subsequent primary data transfers. This is particularly pertinent for large projects in which a plurality of processors are tasked with different aspects of a problem or production. In one variation, secondary data transfers indicate the possible parameters of the primary data transfers, (and may be referred to as "processor capacities"). For instance, if a producing processor is unable to create graphical or audio data with a resolution or bitrate greater than a particular threshold, that threshold can be communicated to potential requesting processors in order to avoid matching that producing processor with a requesting processor which demands or is capable of handling greater resolution or bitrate and instead to pair the producing processor with a requesting processor with more modest demands. In one variation, the secondary data transfer may indicate a purchase price quoted by an end user of the producing processor, in which case it may therefore be referred to as the "production price".

The processor performance evaluation system is further configured to detect tertiary data transfers, which are ancillary to the primary data transfer but transmitted by requesting processors to the producing processor. Tertiary data transfers may indicate data formats which the requesting processor is capable of processing or other parameters required of the primary data transfer. Such data formats or other requirements (which may be referred to as "processor requirements") may be set by default and communicated automatically for a requesting processor based on the applications operating on the processor. In one variation, the requirements are set by an end user of the requesting processor. For instance, if a requesting processor is unable to handle mathematical models requiring greater processing power than a certain metric, that metric threshold may be indicated in the secondary data transfer in order to pair it with a producing processor configured to produce simpler mathematical models. As another example, if a requesting processor is configured to manipulate images in png format, the png format can be contained in the tertiary data transfer as a required file format.

Tertiary data transfers may also numerically indicate the utility derived by the requesting processor from the primary data transfer, in which case it may be referred to as a "numerical utility signifier". The numerical utility signifier may be calculated based on the duration the primary data transfer is used by applications running on the requesting processor, the frequency with which the primary data transfer is used by those applications, and the frequency with which the primary data transfer is subsequently transferred from the requesting processor to other processors. If the primary data transfer is subsequently transferred from the requesting processor to other processors ("subsequently requesting processors"), the numerical utility signifier may be modified based on the frequency and duration with which the primary data transfer is used by applications running on the subsequently requesting processors and the frequency with which the primary data transfer is again distributed to additional subsequently requesting processors. Thus, the numerical utility signifier may operate as the second evaluation assigned on the primary data transfer. In one variation, the numerical utility signifier may be set by a user of the requesting processor. In another variation, the tertiary data transfer may comprise funds agreed to between end users of the producing and requesting processors (in which case it may be referred to as "production compensation").

The processor performance evaluation system is additionally configured to initiate quaternary data transfers which are ancillary not only to a given primary data transfer, but also to past primary and secondary data transfers made by a given producing processor, and tertiary data transfers, particularly numerical utility signifiers, transmitted to the given processor.

Quaternary data transfers may include underlying data indicating the number of primary data transfers transferred by the given processor and the number of processors to which the given processor has transferred primary data transfers. Quaternary data transfers may occur as the underlying data is updated or upon being requested by a processor other than the control processor. In particular, the underlying data of a quaternary data transfer may include a first transfer value, which the control processor increases each time a data transfer occurs between the given processor and a new processor, and a second transfer value, which the control processor increases each time a data transfer occurs between the given processor and a processor which has already received a data transfer from the given processor previously. The underlying data may also include and distinguish between and sum numerical utility signifiers that are ancillary to primary data transfers between a given processor and a new processor and numerical utility signifiers that are ancillary to primary data transfers between a given processor and a processor which has already received a data transfer from the given processor previously. Finally, the underlying data may include the data transfer performance evaluation of the primary data transfers as well as previous primary data transfers made by the processor. In one variation, the first and second transfer values track only primary data transfers. In another variation, the first and second transfer values track primary and tertiary data transfers.

Evaluations performed by the processor performance evaluation system are achieved through the implementation of a performance evaluation neural network. In one embodiment, the neural network is trained with a set of primary data transfers, a set of secondary data transfers, and a set of tertiary data transfers, and a set of quaternary data transfers, in which the primary data transfer is entered into a first input layer, the sets of secondary and tertiary data transfers are entered into second and third input layers, and the set of quaternary data transfers are used as an output later, such that the neural network is configured to predict the quaternary data transfer based on the primary, secondary, and tertiary data transfers.

The secondary and tertiary data transfers may be preprocessed prior to entry into the neural network by detecting quantitative components of the data transfers, such as the size of the data transfers, detection of time elements stored therein, and the quantity of secondary and/or tertiary data transfers for a given primary data transfer.

In one embodiment, the neural network receives the primary data transfers and processor requirements as input layers and is configured to predict specifically the numerical utility signifier; such a neural network would be trained on sets of primary data transfers and processor requirements. In this embodiment, the predicted numerical utility signifier operates as the first evaluation of the processor performance evaluation system. Thus, the third evaluation is a combination of the first evaluation performed by the neural network with the evaluation embodied by the numerical utility signifier and performed by the requesting processor, thereby averaging out any discrepancy of an individual requesting processor with the evaluation performed by the neural network, which is trained with evaluations performed by all requesting processors.

In another embodiment, the neural network receives the primary data transfers as an input layer and is configured to predict the production price. In this embodiment, the production price operates as the first evaluation of the processor performance evaluation system and the production compensation operates as the second evaluation.

The primary data transfer may be substantially graphical data, such as still images, or substantially audio data, such as voice recordings or music, or a combination of graphical and audio data, such as video. The neural network used to evaluate the graphical and/or audio data may be recurrent neural networks.

Producing processors may be assigned to requesting processors for data transfer by first filtering the producing processors for producing processors with processor capacities which match the processor requirements of the requesting processors, and then by prioritizing producing processors based on their data transfer performance evaluation. Thus, if a production request, embodied in a tertiary data transfer, is submitted to the processor performance evaluation system, the processor performance evaluation system may identify a producing processor by selecting the producing processor with the highest performance evaluation from amongst the producing processors which have processor capacities that match the processor requirements. In one variation, the processor performance evaluation system presents a list of producing processors to an end user of the requesting processor, with the producing processors ordered or otherwise ranked according to their performance evaluation.

DETAILED DESCRIPTION

Figure 1:
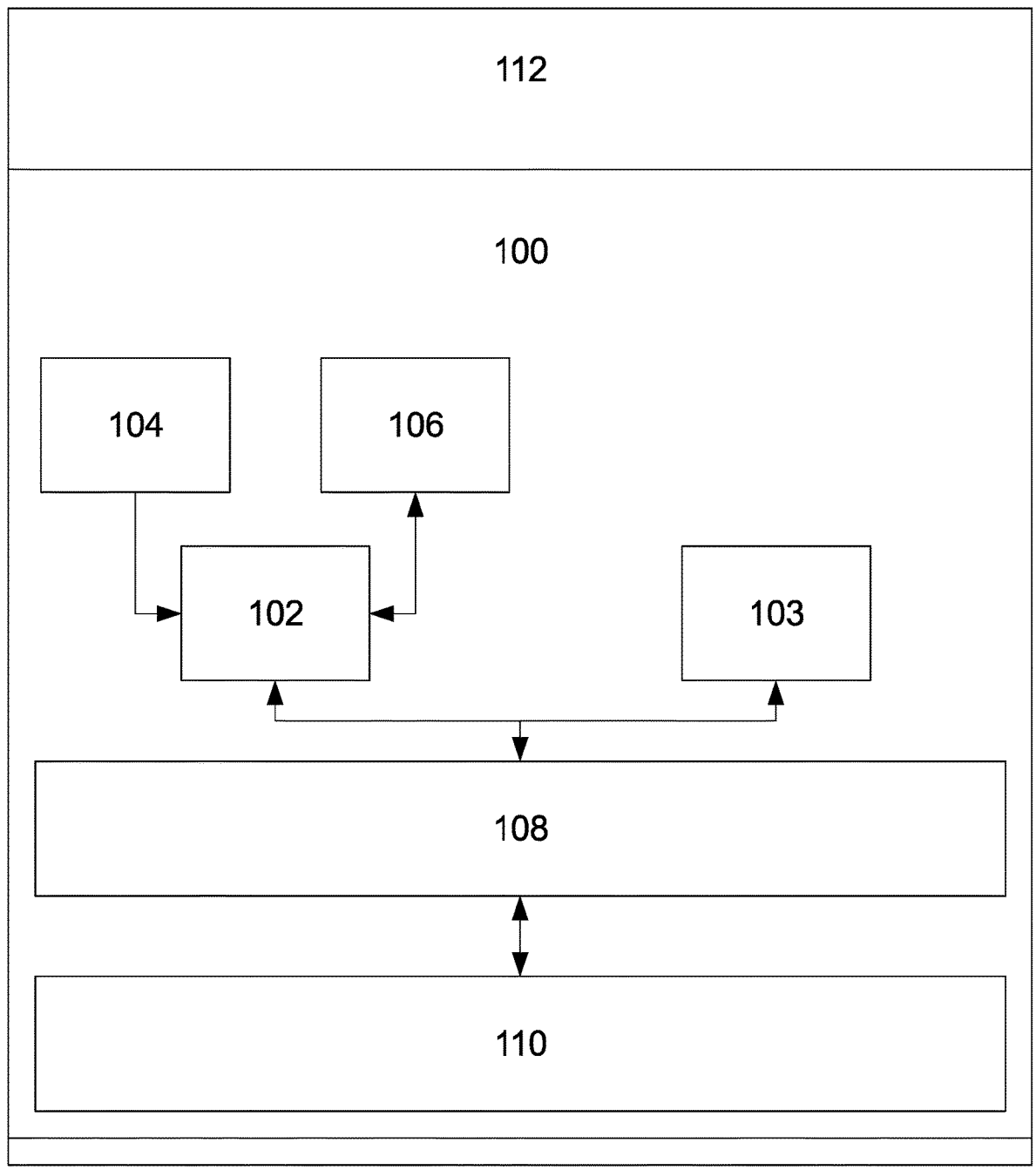
FIG. 1 shows an exemplary system diagram.

As shown in FIG. 1, a set of processors 100 may include a control processor 110 and a set of producing processors 102 and requesting processors 103, with the producing processors coupled to input devices 104 and data production applications 106. Producing processors may engage with requesting processors and vice versa via a processor performance evaluation system 108 that is configured to pair producing and requesting processors and evaluate data production, processing, and transfer events. A requesting processor may also operate as a producing processor for another requesting processor. These processors may be connected over a network 112.

Figure 2:
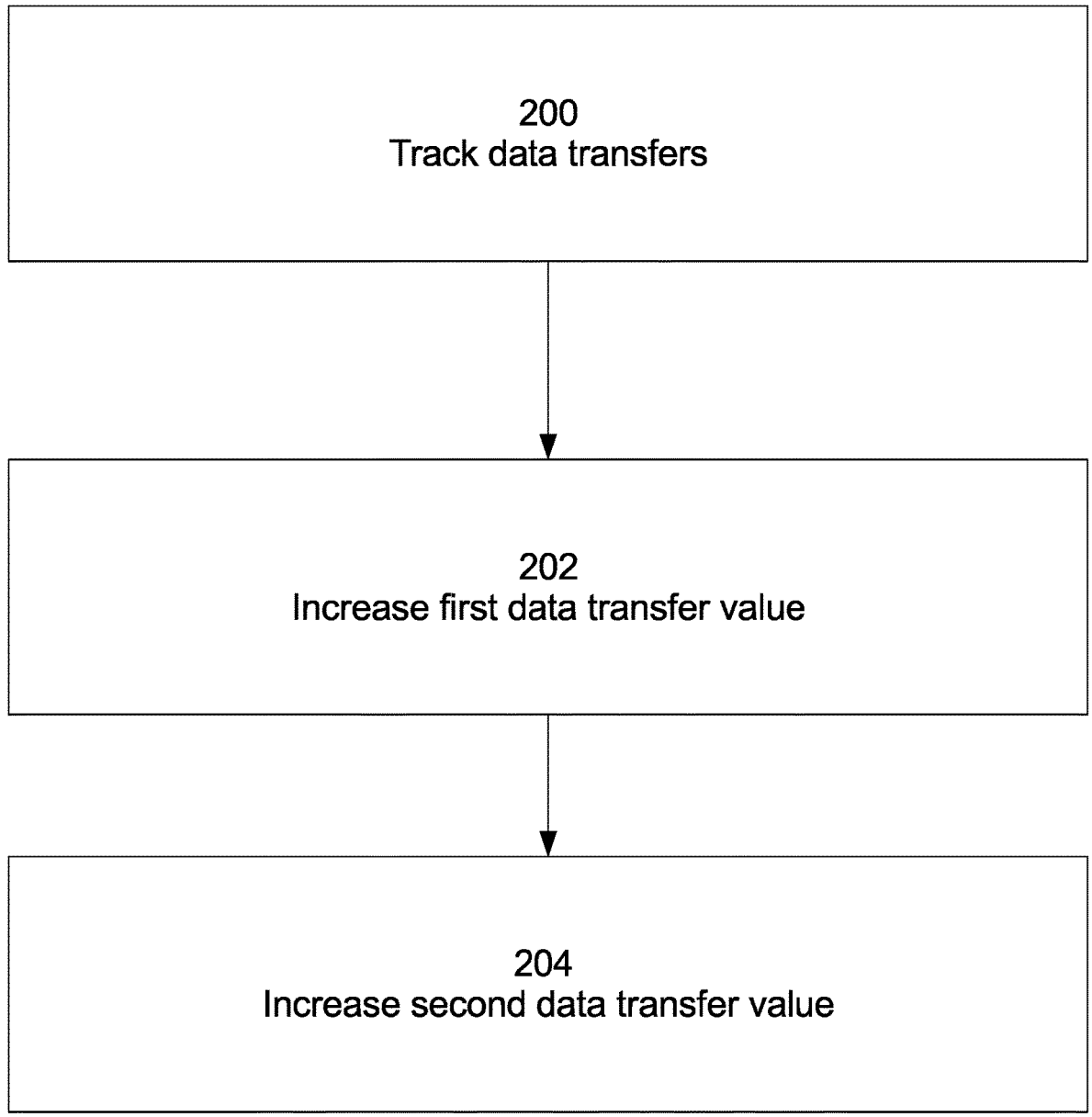
FIGS. 2-10 show exemplary system processes.

As shown in FIG. 2, the control processor may be programmed to track data transfers occurring between processors 200, increase a first data transfer value when a data transfer occurs between a data providing processor and new data requesting processors 202, and increase a second data transfer value when a data transfer occurs between the data producing processor and data requesting processors who previously requested at least one data transfer 204. Data transfer tracking may occur by relaying all requests for data transfer from data requesting processors to the control processor and then to the data providing processor, then processor requirements match the processor capacities, task the producing processor with the primary data transfer.

Figure 3:
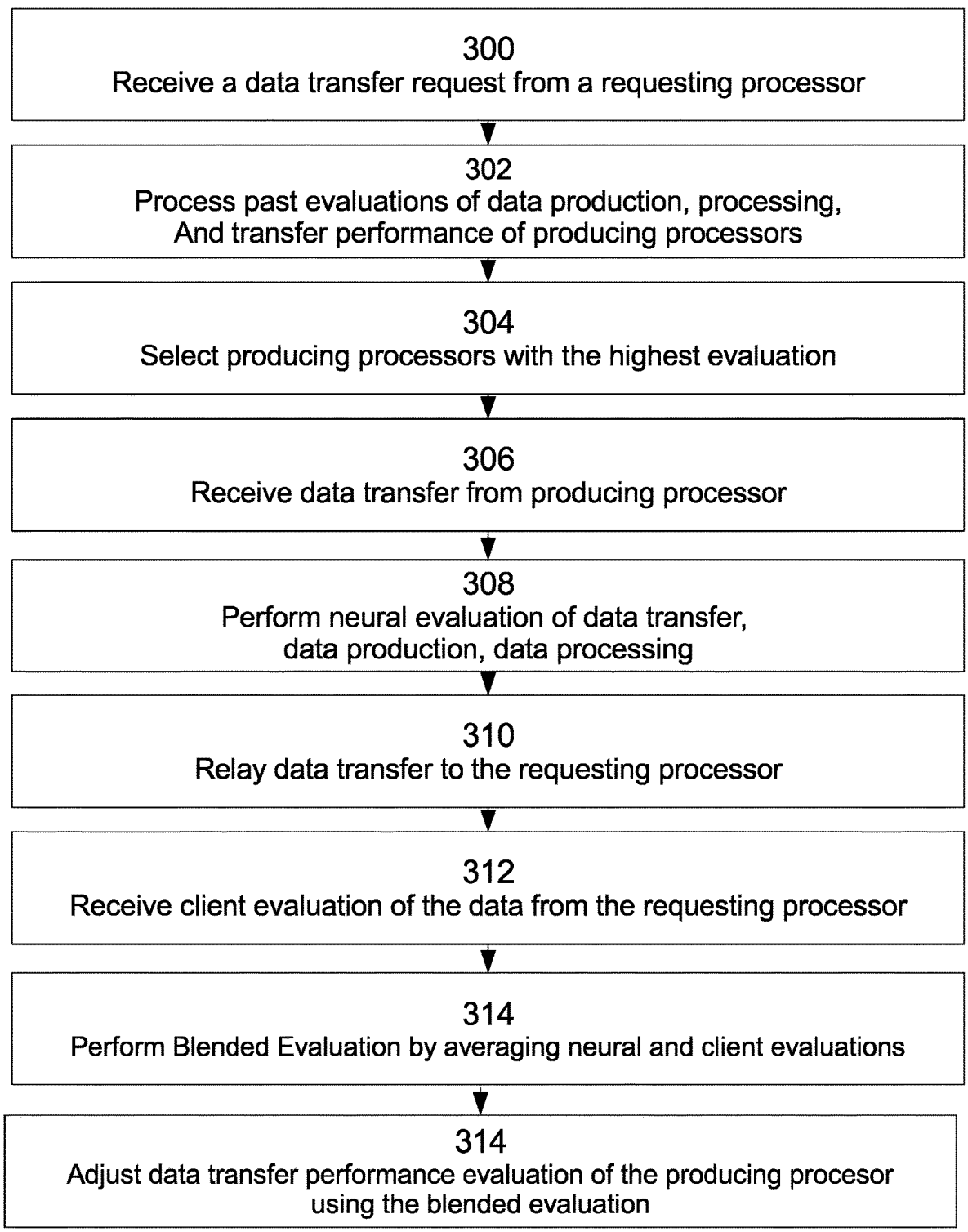

As shown in FIG. 3, the processor performance evaluation system is configured to receive a data transfer request from a requesting processor 300, process past evaluations of data production, processing, and transfer performance of producing processors 302, select or present for selection one or more producing processors with the highest evaluation 304, receive a data transfer from the producing processor 306, perform a neural evaluation of the data comprising the data transfer as well as the production and processing of the data using neural networks trained on related data and data transfers 308, relay the data transfer to the requesting processor 310, receive a client evaluation of the data from the requesting processor 312, perform a blended evaluation by combining or averaging the neural and client evaluations 314, and adjust the data transfer performance evaluation of the producing processor using the blended evaluation 316.

Figure 4:
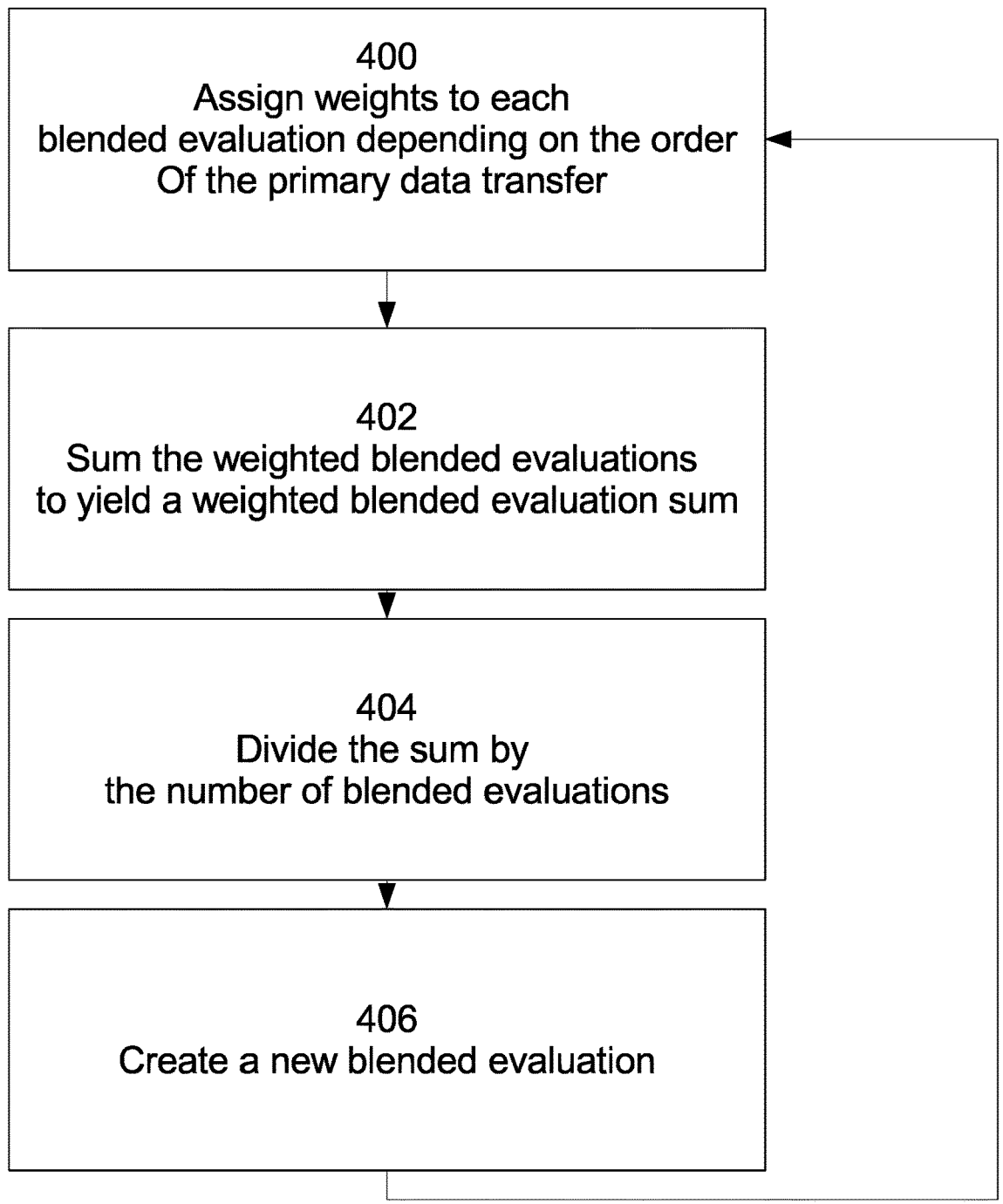

As shown in FIG. 4, the data transfer performance evaluation is calculated by assigning weights to each blended evaluation 400 depending on the order of the primary data transfer, with the earliest blended evaluations being multiplied by lower weights than more recent blended evaluations, summing the weighted blended evaluations to yield a weighted blended evaluations sum 402, and dividing them by the total number of blended evaluations 404. If a new blended evaluation is created 406, the process is repeated. Thus, the influence of early blended evaluations on the data transfer performance evaluation is dampened in order to reduce the significance of errors in early configurations of the producing processor.

Figure 5:
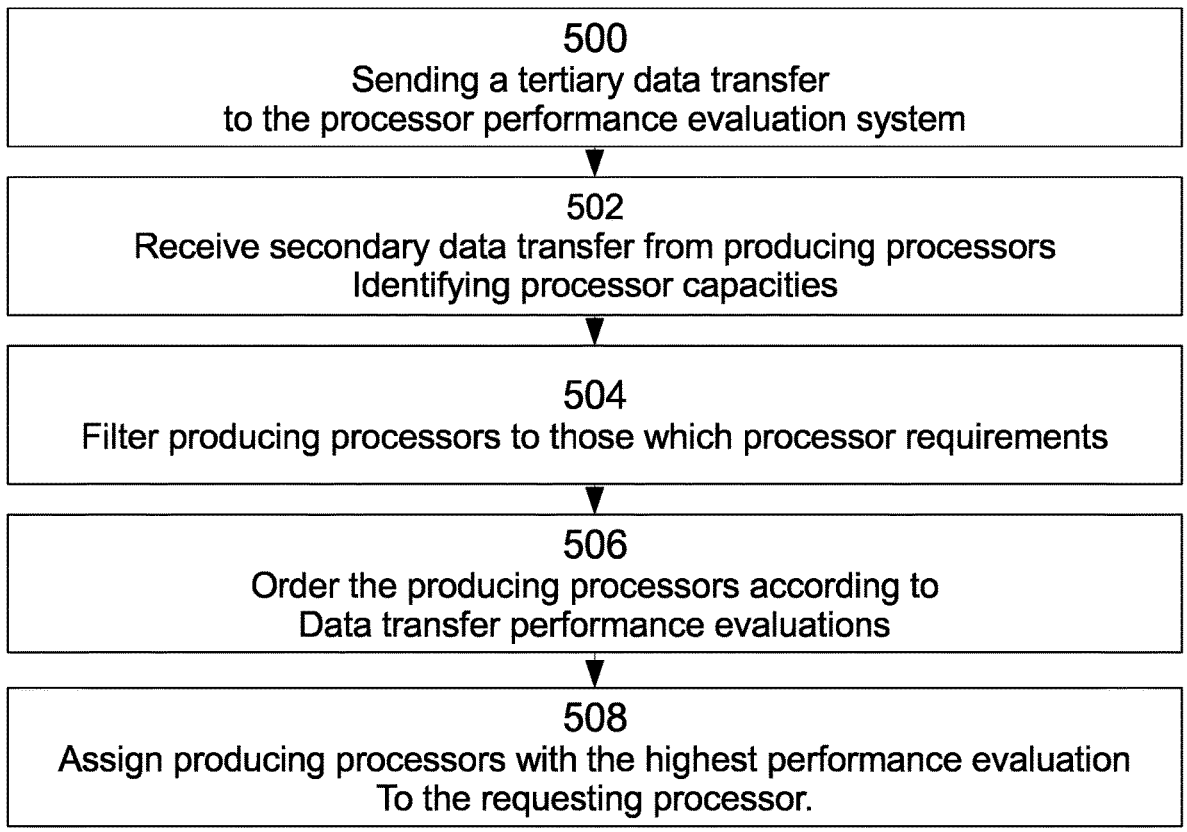

As shown in FIG. 5, a first requesting processor may send a tertiary data transfer to the processor performance evaluation system comprising a required audio file format with a designated bitrate and a required video file format with a designated resolution 500. The processor performance evaluation system may receive a secondary data transfer from a set of producing processors identifying the production outputs they are capable of with respect to audio and video data 502, filter the producing processors based on which producing processors are capable of matching the requesting processor requirements 504, order the producing processors according to their data transfer performance evaluation 506, and assigns the producing processor with the highest performance evaluation to the requesting processor 508. In one variation, the processor performance evaluation system transmits the ordered list to the requesting processor.

Figure 6:
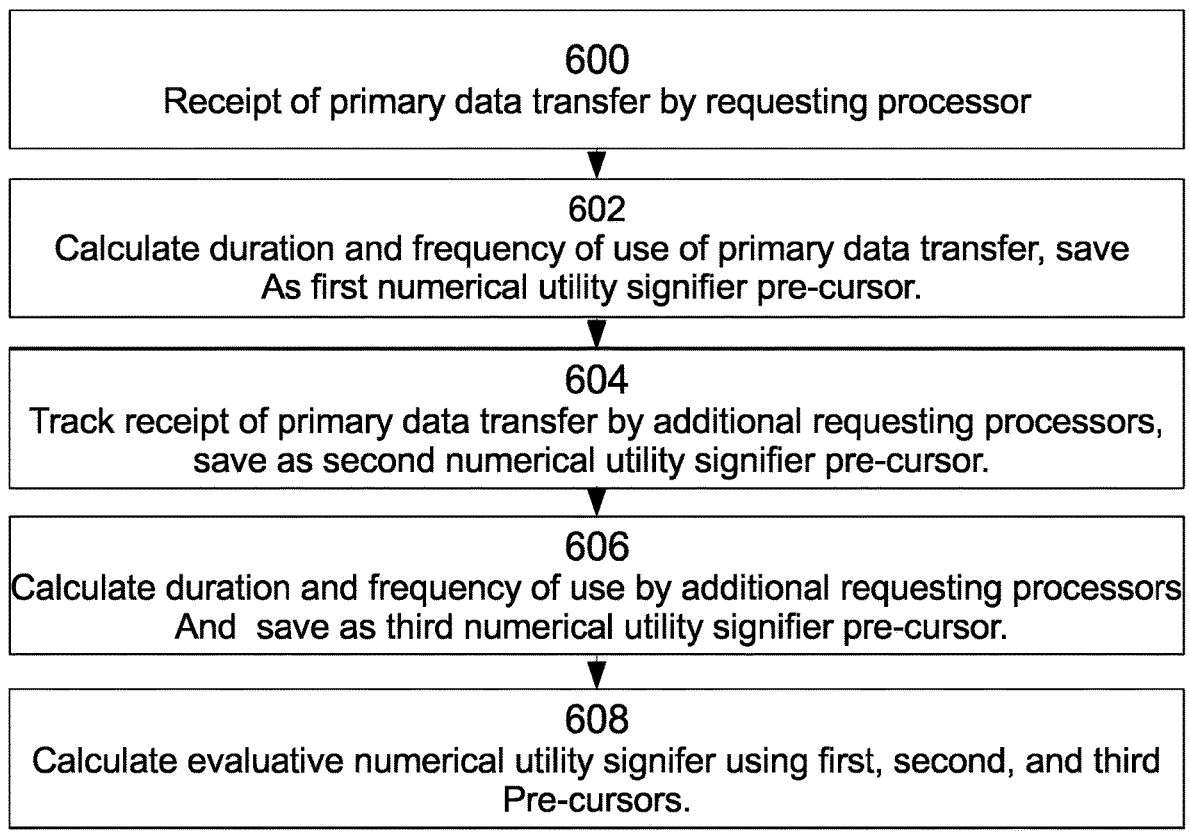

As shown in FIG. 6, after a primary data transfer is received by a requesting processor 600, the duration and frequency with which the primary data transfer is used by applications running on the requesting processor are calculated and saved as a first numerical utility signifier pre-cursor 602. If the primary data transfer is transferred from the requesting processor to additional requesting processors, the number of additional requesting processors receiving the primary data transfer is saved as a second numerical utility signifier pre-cursor 604. In one variation, the duration and frequency with which the primary data transfer is used by applications running on the additional requesting processors are calculated and saved as a third numerical utility signifier pre-cursor 606. The first, second, and/or third numerical utility signifier pre-cursors are used to calculate an evaluative numerical utility signifier, which operates as the client evaluation of the primary data transfer 608.

Figure 7:
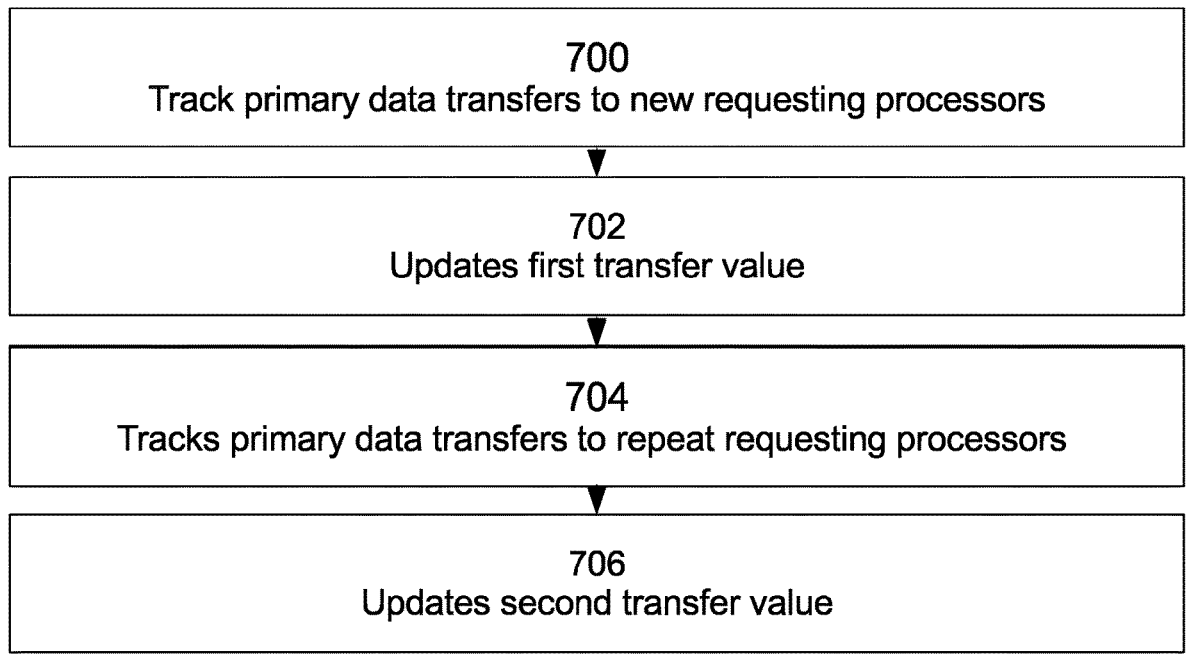

As shown in FIG. 7, the processor performance evaluation system tracks each time a producing processor transfers a primary data transfer to a new requesting processor 700 and saves or updates the number as a first transfer value 702, and each time the producing processor transfers a primary data transfer to a requesting processor to which a previous primary data transfer has previously been sent 704 as a second transfer value 706.

Figure 8:
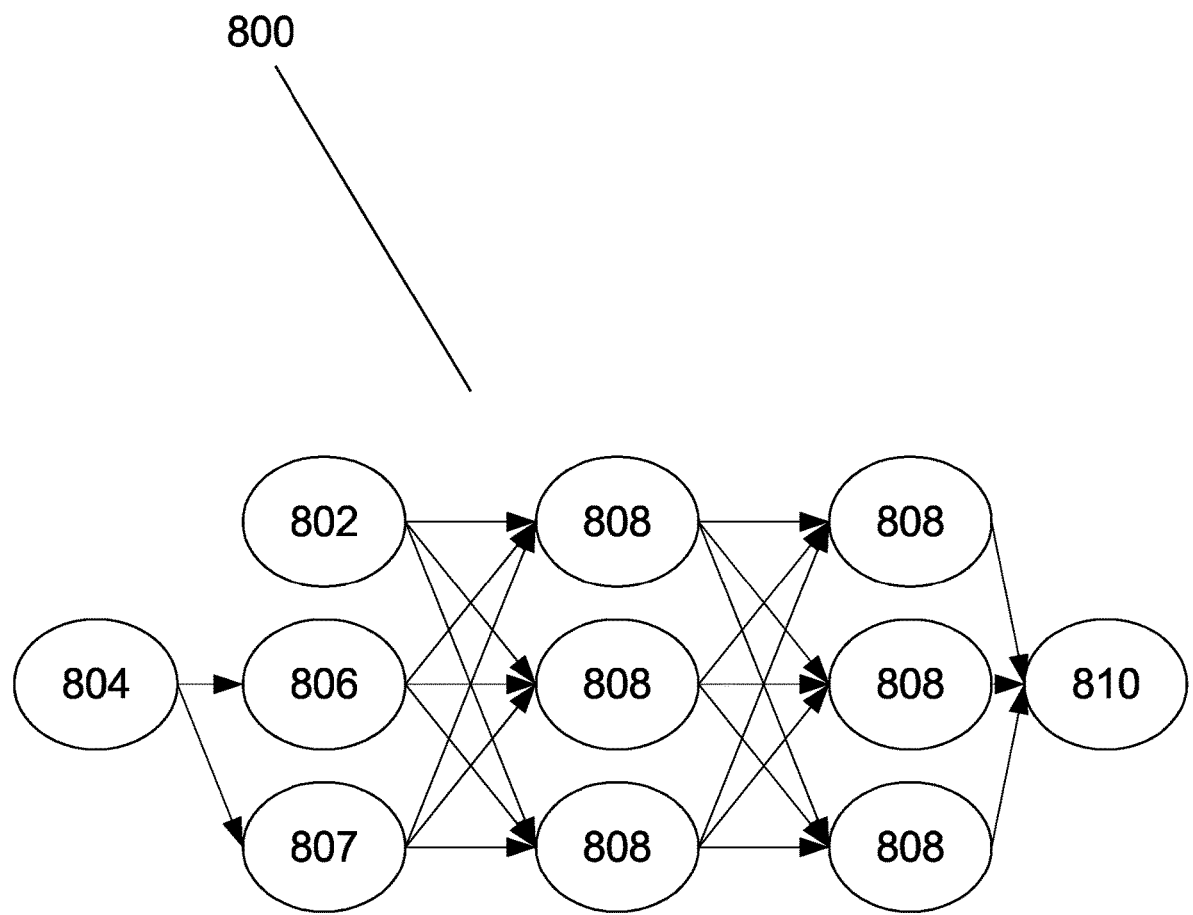

As shown in FIG. 8, the control processor operates a neural network 800 which comprises a first input layer consisting of primary data transfers 802. The secondary and tertiary data transfers undergo pre-processing 804 detecting quantitive components such as processor requirements or capacities, and are then entered into a second input layers 806 and 807. The data enters a series of hidden layers 808. The neural network is configured to predict the associated quaternary data transfers 810.

Figure 9:
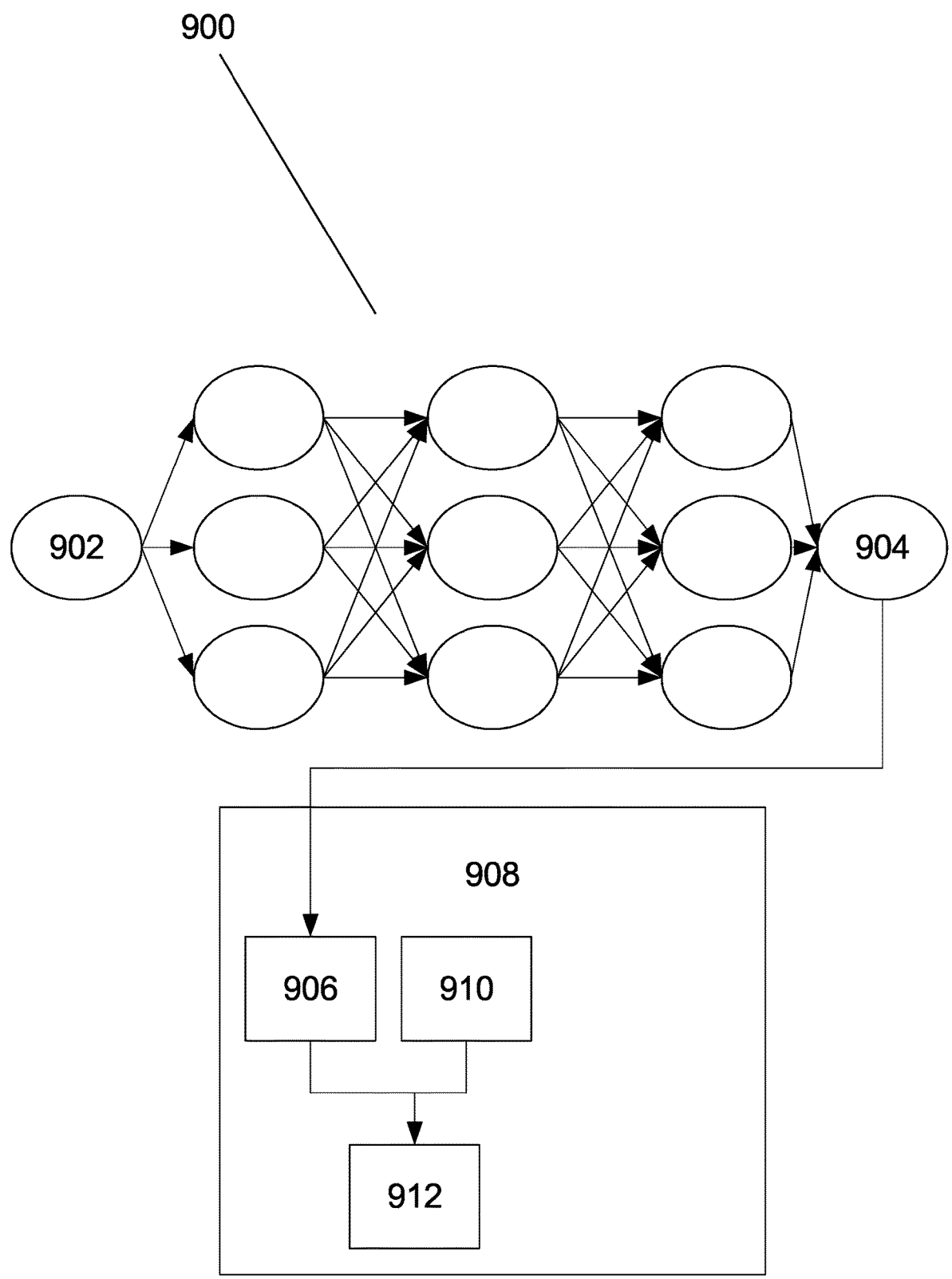

As shown in FIG. 9, the control processor operates a neural network 900 which receives a primary data transfer as an input layer 902 and is configured to predict a numerical utility signifier 904. This numerical utility signifier operates as the first evaluation 906 of the processor performance evaluation system 908 and is combined with the client evaluation 910 to produce a blended evaluation 912.

Figure 10:
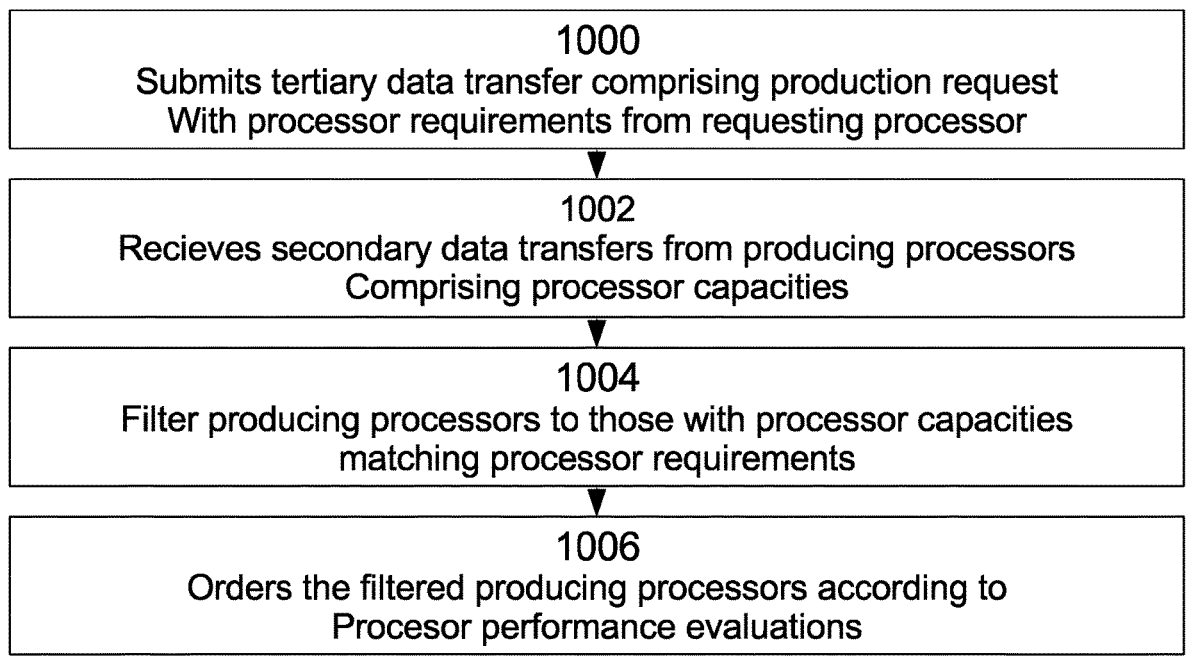

As shown in FIG. 10, a requesting processor submits a tertiary data transfer comprising a production request and processor requirements to the processor performance evaluation system 1000. The processor performance evaluation system receives secondary data transfers comprising processor capacities 1002 from producing processors, filters the producing processors 1004 for producing processors with production capacities matching the processor requirements, and orders the filtered producing processors 1006 according to their processor performance evaluations.

The invention claimed is:

1. A system comprising requesting processors, producing processors, and a control processor, the processors connected over a network;
   a. with the control processor configured to receive data requests and processor requirements from the requesting processors and select producing processors to handle the data requests based on the processor requirements and processor performances signifiers of the producing processors;
      i. with the processor requirements designating data parameters for the requested data;
   b. with the producing processors configured to receive data requests and processor requirements from the requesting processors via the control processor, produce primary data and secondary data based on the data requests and processor requirements, and transmit the primary data and the secondary data to the control processor;
      i. with the secondary data including instructions for the requesting processors on processing the primary data;
   c. with the control processor configured to predict numerical utility signifiers of the primary data using neural networks, with the primary data and the processor requirements being used as input for the neural networks;
   d. with the control processor configured to transmit the primary data and the secondary data to the requesting processor;
   e. with the requesting processors configured to compute client numerical utility signifiers based on the frequency and duration for which the primary data is used by the requesting processors;
   f. with the control processors configured to combine the predicted numerical utility signifiers with the client numerical utility signifiers to yield blended numerical utility signifiers, and combined the blended numerical utility signifiers with the processor performances signifiers to update the processor performance signifiers;
   g. with the control processor configured to order producing processors based on their processor performance signifiers.

2. The system of claim 1, with the processor performance signifiers formed by additionally calculating the number of requesting processors which received the requested data.

3. The system of claim 1, with the client numerical utility signifiers set by end users of the requesting processors.

4. The system of claim 1, with the control processor configured to track each time the producing processors transmits primary data to new requesting processors and each time the producing processors transmits primary data to requesting processors which the producing processors previously transmitted primary data.

5. The system of claim 1, with the primary data comprising graphical data produced using graphical data generating neural networks.

6. The system of claim 1, with the primary data comprising video data produced using graphical data generating neural networks.

7. The system of claim 1, with the primary data comprising mathematical models produced using model generating neural networks.

8. The system of claim 1, with the primary data comprising audio data produced using audio-generating neural networks.

* * * * *